United States Patent

Sequeira et al.

[11] Patent Number: 5,956,246
[45] Date of Patent: Sep. 21, 1999

[54] LOW-NOISE SWITCHING POWER SUPPLY

[75] Inventors: Melwyn Felix Sequeira, Plantation; Richard Lee Taylor, Cooper City; Mirjana Milosevic-Kvajic, Miami Beach; Jerome Joseph Kathalynas, Pembroke Pines, all of Fla.

[73] Assignee: Coulter International Corp., Miami, Fla.

[21] Appl. No.: 08/784,656

[22] Filed: Jan. 21, 1997

Related U.S. Application Data

[63] Continuation-in-part of application No. 08/557,227, Nov. 14, 1995, abandoned.

[51] Int. Cl.$^6$ .................................................. H02M 1/100
[52] U.S. Cl. ............................................................... 363/144
[58] Field of Search ......................... 307/44, 45, 84; 363/69, 44, 47, 144, 65, 68; 323/266, 268, 269

[56] References Cited

U.S. PATENT DOCUMENTS

| | | | |
|---|---|---|---|
| 3,818,128 | 6/1974 | Chambers et al. | 363/26 |
| 4,030,024 | 6/1977 | Chambers et al. | 323/267 |
| 5,414,340 | 5/1995 | Gannon | 323/266 |

*Primary Examiner*—Shawn Riley
*Attorney, Agent, or Firm*—Warren W. Kurz

[57] ABSTRACT

A power supply apparatus which includes at least one switching power supply disposed in a chassis connected to earth ground and at least one D.C. to D.C. converter whose inputs float with respect to system ground. To reduce transmission of high-frequency electrical switching energy from the switching power supply to the load, the invention contemplates a tuned reactive circuit connected between the system ground and the earth ground. Electrical switching energy is shunted to earth ground by way of bypass capacitors located at various stages of the power supply apparatus. A further aspect of the apparatus contemplates the interposition of low-pass filters between the switching power supply and one or more D.C. to D.C. converters connected to the power supply and/or between the D.C. to D.C. converters and their respective loads to effectively eliminate radiated electromagnetic energy.

4 Claims, 3 Drawing Sheets

| FIG. 3a | FIG. 3b |

LOW-NOISE SWITCHING POWER SUPPLY

This application is a CIP of Ser. No. 08/557,227, filed Nov. 14, 1995, now abandoned.

BACKGROUND OF THE INVENTION

1. Field of the Invention

The invention relates to improvements in switching power supplies for providing D.C. electrical energy to one or more electrical loads. More particularly, it relates to a switching power supply in which certain high frequency noise signals produced by the switching component of such supplies are effectively isolated from the load. Thus, the switching power supply of the invention is particularly useful in low signal applications.

2. Discussion of the Prior Art

In blood cell counters and a variety of other electronic instrumentation and control applications, it is necessary to supply well-regulated D.C. electrical energy to a plurality of electrical loads. Such loads may not only be physically located remotely from one another, but may also have voltage and current requirements which differ markedly from one load to another. To accommodate such loads, it is common to use a single bulk D.C. power supply to feed a common D.C. bus which, in turn, feeds a plurality of local D.C. to D.C. converter modules which are adopted to provide the voltage and current required by each respective load. Preferably, each D.C. to D.C. converter is physically located in close proximity to the load(s) supplied by it. This reduces voltage drops due to wiring resistance and permits precise regulation of load voltages despite input voltage fluctuations and/or changes in the magnitude of the current demanded by the load. Typically, a linear power supply feeds the D.C. bus supplying the D.C. to D.C. converters.

In a conventional linear power supply, A.C. line voltage is applied to the primary winding of a transformer. The respective outputs of one or more secondary windings of the transformer are then rectified and capacitively or otherwise regulated to reduce output ripple to the degree necessary to supply the voltage and current requirements of a particular D.C. load. While linear power supplies are capable of providing a well-regulated output with little if any electrical noise, they tend to be physically bulky, heavy and expensive to build.

Owing to the above-noted limitations of linear power supplies, systems engineers have increasingly turned to switching power supplies for a variety of applications. As used herein, the phrase "switching power supply" is to be construed broadly and refers to any power supply having an output which is regulated at least in part by altering the conductive state of a semiconductor switching device, such as a transistor, to control the width, duty cycle or frequency of a successive series of pulses. Because switching power supplies do not rely primarily on capacitors or other passive components for output regulation, they are typically more efficient, lighter in weight and less expensive than linear power supplies of comparable output power rating. However, the performance of switching power supplies entails certain characteristics which heretofore have rendered such power supplies unsuitable for some applications. Notably, the operation of the semiconductor switching devices in switching power supplies tends to generate a significant amount of high frequency electrical switching energy. This electrical switching energy creates a problem in extremely noise-sensitive applications, such as in many medical instruments in which signals of small magnitude are measured or otherwise processed. In such devices, high frequency electrical switching energy tends to mask the signal of interest and thereby adversely impacts the performance of the device. Normally, this problem can be overcome by A.C. coupling the positive and negative inputs of each D.C. to D.C. converter directly to one common ground. However, such an arrangement is not satisfactory when dealing with extremely noise-sensitive loads because of the tendency of noise to conduct along the common ground path and interfere with the proper operation of the loads.

SUMMARY OF THE INVENTION

In view of the foregoing, an object of the invention is to provide an improved switching power supply which transfers only low levels of electrical switching energy to any load coupled to the supply. A further object of the invention is to provide a switching power supply which, while transferring only low levels of electrical switching energy to its loads, also radiates sufficiently low levels of electromagnetic interference (EMI) as to be capable of complying with the standard limits imposed thereon by various regulatory agencies without incorporating unduly elaborate or expensive shielding and/or filtering.

According to the invention, there is provided an improved apparatus for supplying D.C. electrical energy to a system load having a system ground. The D.C. power supply apparatus of the invention features a conventional switching power supply disposed in an earth-grounded chassis, such supply having an input coupleable to a source of alternating current electrical energy, a pair of D.C. output terminals connected to a DC to DC converter, such DC to DC converter having (i) a pair of input connections which float with respect to system ground, are shunted to earth ground by capacitive means and are coupled to respective output connections of the switching power supply, and (ii) a pair of output terminals connectable to the system load, and AC coupled to earth ground by capacitive means. In contrast with similar switching power supplies of the prior art, the power supply of the invention features a reactive circuit which is interconnected between earth ground and system ground. This reactive circuit functions to establish an A.C. impedance differential between the earth and system grounds, the effect being that the switching noise appearing on earth ground is dissipated through the reactive circuit, and thereby prevented from appearing on system ground. Preferably, this A.C. impedance differential is established by coupling system ground to earth ground through a tuned inductive network provided by individual ferrite beads (i.e. inductors) whereby certain high frequency electrical switching energy components appearing on earth ground are selectively isolated from system ground.

According to a preferred embodiment, the low-noise, switching power supply of the invention further includes a low-pass filter electrically connected between the switching power supply and the D.C. to D.C. converter, and/or a low-pass filter electrically connected between the D.C. to D.C. converter and the system load. The effect of the low-pass filters is a reduction in the amount of radiated electromagnetic energy produced by the power supply apparatus.

The invention and its various advantages will be better understood from the ensuing detailed description of preferred embodiments, reference being made to the accompanying drawings in which like reference to characters drawn to like parts.

DETAILED DESCRIPTION OF PREFERRED EMBODIMENTS

Figure 1:
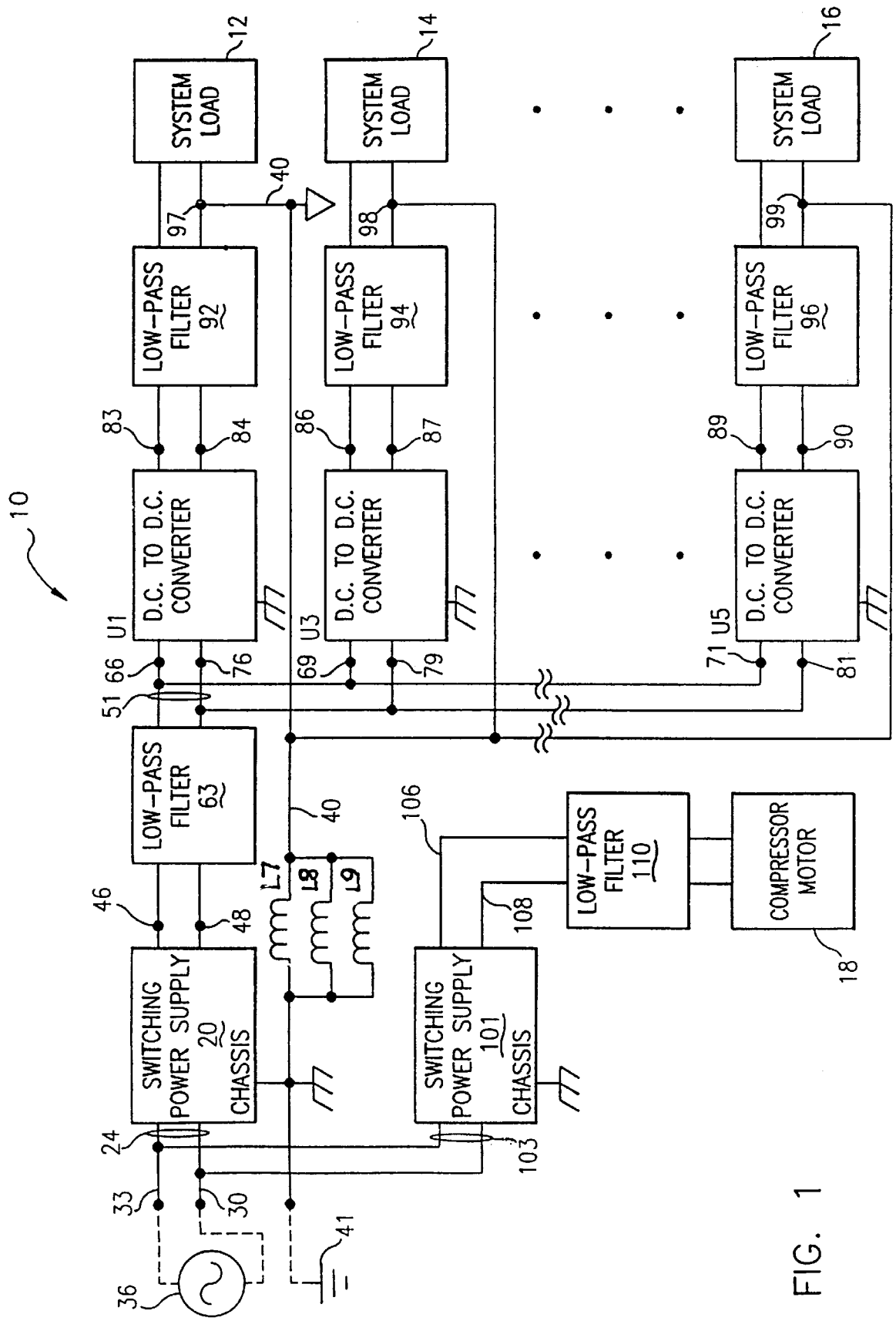
FIG. 1 is a block diagram of a preferred low-noise distributed switching power apparatus constructed according to the present invention.

FIG. 1 shows a block diagram of a distributed switching power supply apparatus 10 suitable for supplying low-noise D.C. electrical energy to a plurality of system loads 12, 14, 16 and 18. These system loads may be alike or may have voltage and current requirements which differ from one another. Some of the loads coupled to apparatus 10 such as various ones of loads 12, 14 and/or 16 may be adversely affected by the presence of electrical switching energy while others, such as load 18, may comprise a device such as a D.C. compressor motor which itself generates significant levels of electrical switching energy. Network 10 includes at least one switching power supply 20 having an A.C. input 24, including a line conductor 30 and a neutral conductor 33 coupleable to an external AC. power main 36. Apparatus 10 also includes a system ground conductor 40 which is typically coupled to the earth ground 41 associated with AC. power main 36. A slight A.C. impedance differential is established between earth ground and system ground by coupling system ground conductor 40 to earth ground 41 through conductors traversing individual ferrite beads (i.e. inductors) L7, L8 and L9, so as to isolate noise on earth ground 41 from system ground 40. To provide at least some electromagnetic shielding, the chassis of each switching power supply in network 10, including that of switching power supply 20, may be connected directly to the earth ground 41 as indicated. Switching power supply 20 may suitably comprise any of a variety of known types, including but not limited to a "chopper" type or an "inverter" type.

In a typical "chopper" type switching power supply, A.C. input voltage is usually applied to a transformer and stepped down to a lower magnitude A.C. voltage. This lower A.C. voltage is then rectified and filtered to provide a D.C. voltage which is converted to a high frequency square wave by semiconductor switches operated by a control circuit. Using feedback, the control circuit regulates the duty cycle of the square wave to regulate the D.C. output voltage which is applied to the load. This D.C. output voltage is typically derived by rectifying and filtering the square wave signal.

In a typical "inverter" type switching power supply, A.C. line input voltage is rectified, filtered and converted to a high frequency square wave by a switching circuit. This square wave is applied to the primary side of a high frequency transformer. The A.C. signal appearing at the secondary side of the transformer is then rectified and filtered to provide the desired D.C. load voltage which is regulated by providing some form of voltage feedback or current feedback to the switching circuit generating the square wave.

Regardless of the type used, switching power supply 20 includes a D.C. output terminal 46 and a D.C. return 48 which are coupled to respective conductors associated with D.C. bus 51. D.C. bus 51, in turn, is coupled to at least one D.C. to D.C. converter U1, and is typically coupled to a plurality of additional D.C. to D.C. converters U3 and U5. While D.C. bus 51 may be connected directly to the inputs of D.C. to D.C. converters U1, U3 and U5, a low-pass filter 63 is preferably interposed between the output terminals 46 and 48 of switching power supply 20 and the portion of bus 51 common to the inputs of D.C. to D.C. converters U1, U3 and U5. To minimize the radiation of electromagnetic energy, filter 63 should be positioned as close to switching power supply 20 as possible with the electrical conductors connecting the output of switching power supply 20 to filter 63 being kept as short as practicable. Each D.C. to D.C. converter U1, U3 and U5 includes a positive input 66, 69 and 71, respectively, which is connected to the conductor of bus 51 coupled to the D.C. output terminal 46 of switching power supply 20. Similarly, each D.C. to D.C. converter U1, U3 and U5 includes a negative input 76, 79 and 81, respectively connected to the conductor of bus 51 coupled to the D.C. return terminal 48 of switching power supply 20. D.C. to D.C. converters U1, U3 and U5 are selected in accordance with the voltage, current and regulation requirements of the respective loads 12, 14 and 16 to which each is coupled by way of respective pairs of output connections 83 and 84, 86 and 87, and 89 and 90. Preferably, suitable low-pass filters 92, 94 and 96 respectively are electrically interposed between the output of each respective D.C. to D.C. converter U1, U3 and U5 and the respective loads 12, 14 and 16 driven by each of them, to further reduce electromagnetic energy produced by apparatus 10. Each load 12, 14 and 16 is coupled to system ground 40 by connections as indicated at nodes 97, 98 and 99.

In order to effectively reduce the transmission of electrical switching energy from switching power supply 20 to any of system loads 12, 14 and 16 which may be sensitive to noise, the invention contemplates that the positive and negative inputs of D.C. to D.C. converters U1, U3 and U5 float with respect to system ground 40. The positive and negative inputs of D.C. to D.C. converters U1, U3 and U5 may be completely electrically isolated from system ground or more preferably, A.C. coupled thereto by way of bypass capacitors C3, C3', C5, C5', C8 and C8' which are connected between earth ground 41 and each one of the positive and negative inputs of D.C. to D.C. converters, U1, U3 and U5, respectively. These bypass capacitors C3, C3', C5, C5', C8 and C8' effectively shunt any electrical switching energy appearing on the inputs of the D.C. to D.C. converters U1, U3 and U5 directly to earth ground 41. Thus, as used herein, the terms "float" or "floating" refer to a substantial absence of D.C. coupling while optionally permitting at least some high frequency A.C. coupling. Preferably, the inputs of all D.C. to D.C. converters included in network 10 float with respect to system ground 40, regardless of whether or not the particular one of the systems loads 12, 14 or 16 driven by any particular D.C. to D.C. converter U1, U3 and U5 requires noise protection.

A further aspect of the invention is illustrated in FIG. 1 only. Apparatus 10 may include at least one additional switching power supply 101 which may be of a type similar to or different from switching power supply 20. Switching power supply 101 includes an A.C. input 103 connected in common to the line conductor 30 and the neutral conductor 33 of the A.C. input 24 of switching power supply 20. Switching power supply 101 further includes a D.C. output terminal 106 and a D.C. return terminal 108 which supply an additional system load such as compressor motor 18. Preferably, this additional load 18 is coupled to switching power supply 101 by way of a low-pass filter 110 tuned to substantially attenuate the radiated electromagnetic energy generated by operation of compressor motor 18 as well as that generated by switching power supply 101. To help minimize radiation of such electrical energy, low-pass filter 110 is preferably positioned as close to compressor motor 18 and to switching power supply 101 as practicable with the electrical conductors coupled to D.C. outputs 106 and 108 as well as those coupled to compressor motor 18 being kept as short as practicable. According to this aspect of the present invention, the D.C. outputs 106 and 108 of switching power supply 101 float with respect to system ground 40 and preferably are completely electrically isolated therefrom so as to minimize transmission of electrical switching energy to any of system loads 12, 14 and 16.

Figures 2, 3A:
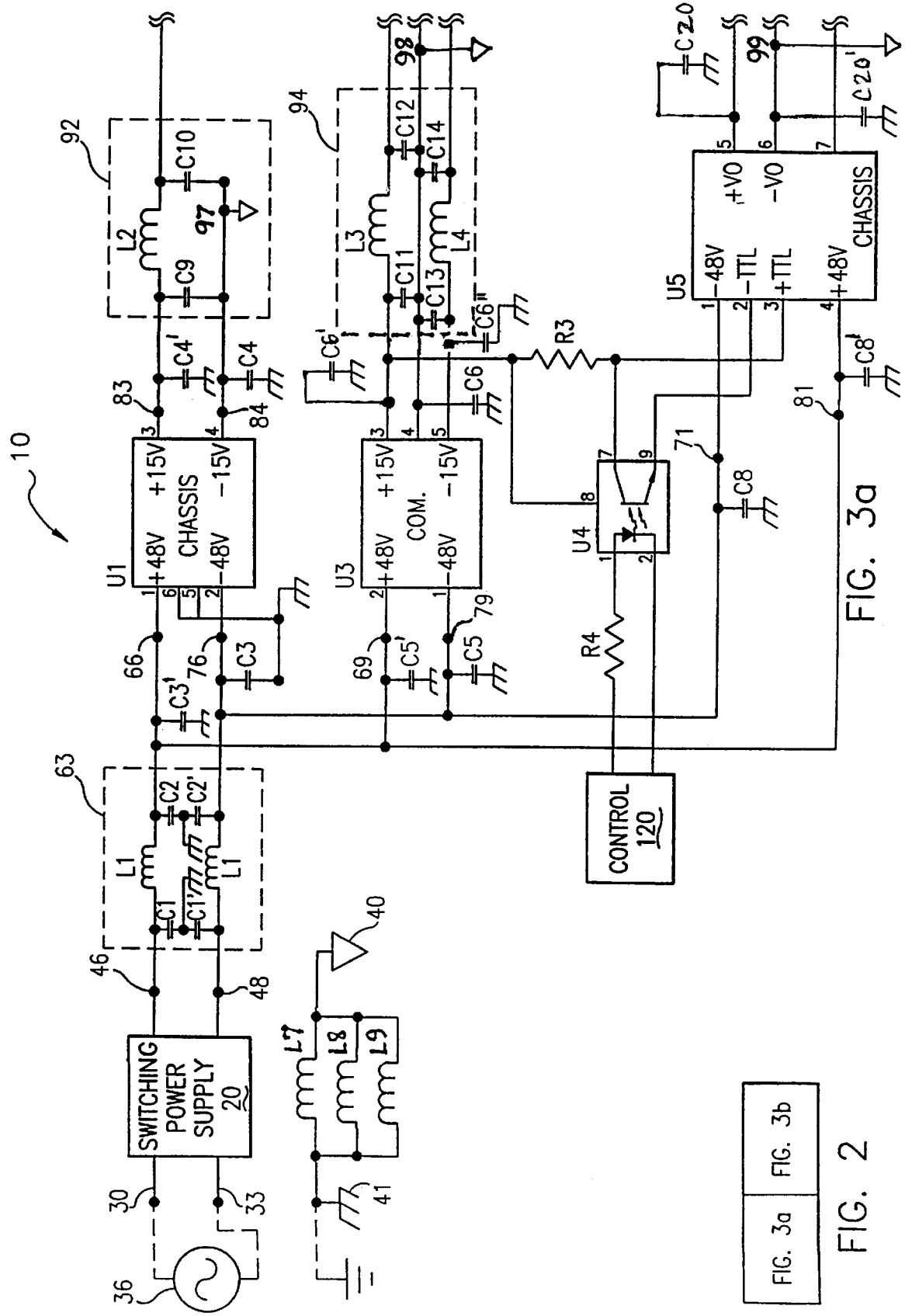
FIG. 2 shows the relationship between FIGS. 3a and 3b.
FIGS. 3a and 3b together are an electronic schematic showing in more detail a low-noise distributed switching power supply apparatus of a type constructed consistently with FIG. 1.
Figure 3B:
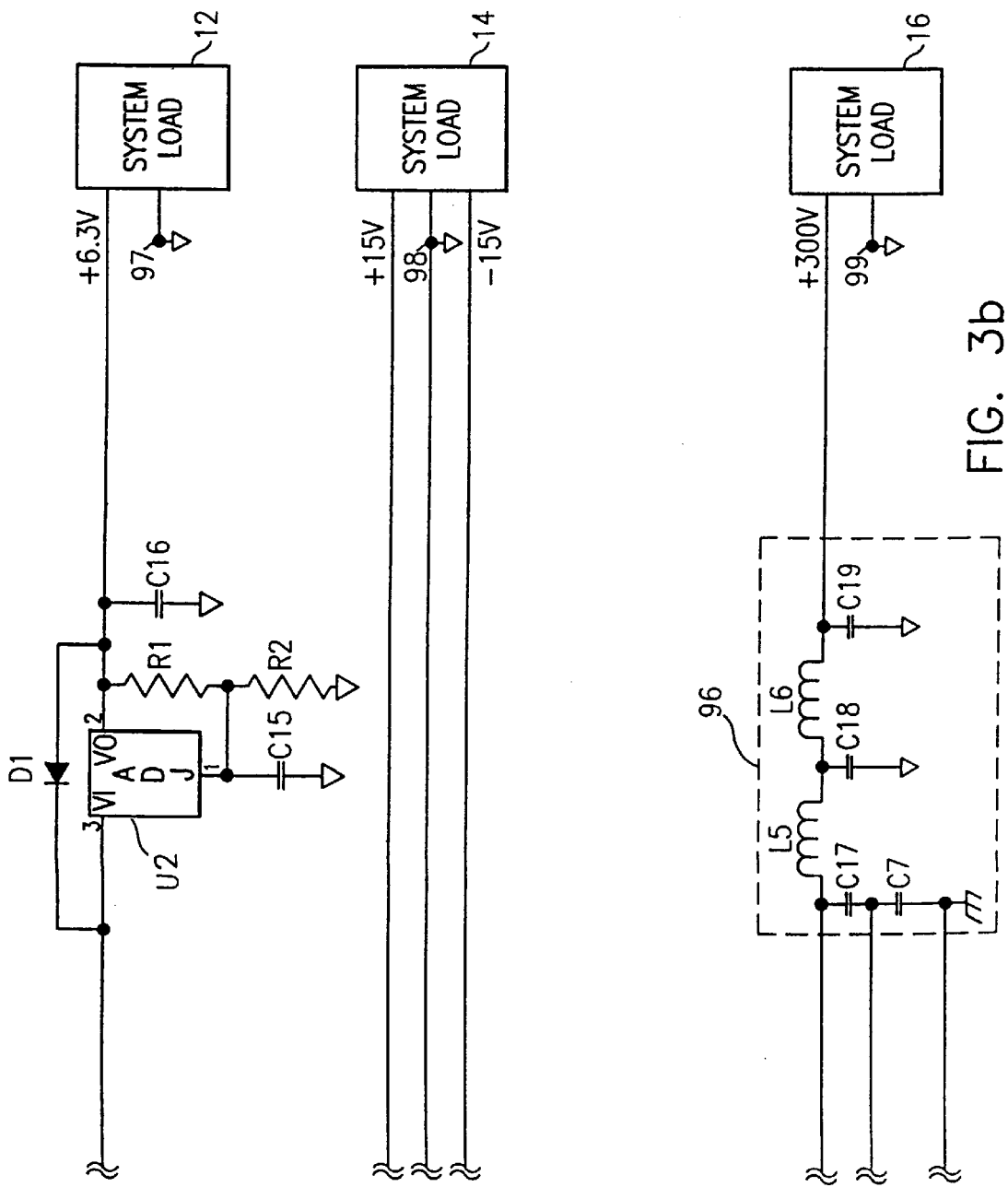

As shown in FIGS. 3a and 3b, the low-noise switching power supply apparatus 10 of the invention includes a switching power supply such as the Model SPF6LG4U6CES358 power supply manufactured by Power-One of Camarillo, Calif., or a suitable equivalent adapted for connection to a suitable A.C. power main 36 by way of a suitable circuit breaker and/or other overcurrent and/or overvoltage protective devices (not shown). The earth ground 41 associated with the A.C. line passes through a tuned reactive circuit, three parallel ferrite beads (i.e. inductors) L7, L8 and L9 to form a quiet system ground 40. To provide the best results, the inductance and impedance characteristics of ferrite beads (i.e. inductors) L7, L8 and L9 are selected in light of the peak electrical switching energy frequencies present in a given system. As shown in FIG. 3a, switching power supply 20 is coupled at its D.C. output terminals 46 and 48 to the respective inputs 66 and 76, 69 and 79, and 71 and 81 of a forty-eight volt to fifteen volt D.C. to D.C. converter U1, a forty-eight volt to fifteen volt D.C. to D.C. converter U3 and a forty-eight to three hundred volt D.C. to D.C. converter U5.

A dual, pi-type low-pass filter 63 consisting of a split winding, common mode choke L1 and capacitors C1, C1', C2 and C2', is electrically connected between the terminals 46 and 48 of switching power supply 20 and each of the D.C. to D.C. converters U1, U3 and U5 whose 48 volt inputs are connected mutually in parallel with one another. The capacitive network formed by C1, C1' and C2, C2' together with common-mode choke L1 form a low-pass filter network which minimizes the effects of radiated electromagnetic energy. The capacitors C1, C1', C2 and C2' are selected so as to present a low enough impedance at the switching frequency of interest to shunt away the electrical switching energy generated by switching power supply 20 to earth ground 41. The positive and negative inputs of D.C. to D.C. converters U1, U3 and U5 are A.C. coupled to earth ground 41 through bypass capacitors C3, C3', C5, C5', C8 and C8' as shown in FIG. 3a, so as to facilitate shunting to earth ground 41 at least a portion of any electrical switching noise not shunted by capacitors C1, C1', C2 and C2'. The bypass capacitors C3, C3', C5, C5', C8 and C8' have a sufficiently low impedance so as to effectively provide an A.C. "short" to earth ground 41. To provide electromagnetic shielding, the chassis of D.C. to D.C. converter U1 is connected to earth ground 41 as illustrated in FIG. 1. The positive and negative D.C. output terminals of D.C. to D.C. converters U1 and U5 are coupled to earth ground 41 by way of bypass capacitors C4, C4', C20 and C20', as shown in FIG. 3a. These bypass capacitors C4, C4', C20 and C20' further shunt to earth ground 41 any residual electrical switching energy not removed by bypass capacitors C3, C3', C5, C5', C8 or C8', and not dissipated within the D.C. to D.C. converters themselves. The bypass capacitors C4, C4', C6, C6', C6", C20 and C20' are selected so as to provide a significantly lower impedance than system ground 40 at the switching frequency of interest, thereby shunting the small amount of residual electrical switching energy back to earth ground 41. As shown in FIG. 1, an output terminal of each D.C. to D.C. converter U1, U3 and U5 is be directly connected to system ground as indicated at nodes 97, 98 and 99.

As shown in FIGS. 3a and 3b, a low-pass filter 92 consisting of an inductor L2 and parallel capacitors C9 and C10 is electrically coupled between the output of D.C. to D.C. converter U1 and system load 12 by way of an adjustable, three-terminal series voltage regulator U2 to facilitate voltage regulation. The capacitive network of C9 and C10 together with L2 form a low-pass pi-type filter network which minimizes the effects of radiated electromagnetic energy. The output terminal of regulator U2 is coupled to its adjustment input by way of a voltage divider consisting of resistors R1 and R2 whose values are selected to reduce the 15 volt input applied to regulator U2 to the 6.3 volts required by system load 12. To stabilize the voltage applied to the adjustment terminal of regulator U2 and thus avoid oscillations, a capacitor C15 is connected in parallel across R2 as shown. To further improve regulation, a capacitor C16 may be connected in parallel with system load 12 as indicated.

As shown in FIG. 3a., D.C. to D.C. converter U3 generates both plus and minus fifteen volt outputs as measured with respect to a common line which may be connected directly to system ground 40 at node 98. The common line of U3 is also A.C. coupled to earth ground 41 through capacitor C6 as shown in FIG. 3a. Similarly, the positive and negative output terminals of D.C. to D.C. converter U3 are coupled to earth ground by way of bypass capacitors C6' and C6". Capacitors C6, C6' and C6" present a low enough impedance at the switching frequency of interest to shunt to earth ground 41 any electrical switching energy generated by D.C. to D.C. converter U3, as well as residual electrical switching energy from switching power supply 20. A low-pass filter 94 consisting of inductors L3 and L4 and capacitors C11, C12, C13 and C14 is connected between the output of D.C. to D.C. converter U3 and system load 14 in the manner shown in FIGS. 3a and 3b, so as to minimize the effects of radiated electromagnetic energy.

As shown in FIG. 3a, D.C. to D.C. converter U5 generates a three-hundred (300) volt D.C. output which can thus be selectively switched on and off as directed according to the output of control 120. The output of D.C. to D.C. converter U5 is coupled to system load 16 through a low-pass filter constructed from a pair of inductors L5 and L6 and capacitors C7, C17, C18 and C19 which serve to minimize the effects of radiated electromagnetic energy. Furthermore, the output terminals of D.C. to D.C. converter U5 are coupled to earth ground 41 by way of bypass capacitors C20 and C20' which are selected so as to present a low enough impedance at the switching frequency of interest to shunt to earth ground 41 the electrical switching energy generated by D.C. to D.C. converter U5, as well as any residual electrical switching energy from switching power supply 20. As in the case of loads 12 and 14, one side of system load 16 is directly connected to system ground conductor 40 as indicated at node 99. While not indicated in FIG. 1, the embodiment of FIGS. 3a and 3b optionally provides for controlling system load 16 by way of a local or remote control 120 coupled by way of a series resistor R4 and an opto-isolator U4 to a pair of TTL control inputs associated with D.C. to D.C. converter U5. Operating voltage for opto-isolator U4 is derived directly from the positive supply output of D.C. to D.C. converter U3. A dropping resistor R3 connected is series as shown, provides current limiting within appropriate TTL voltage levels for driving the output stage of opto-isolator U4. A parts list for the circuit of FIGS. 3a and 3b is set forth in Table 1 below.

TABLE I

PARTS LIST

| | |
|---|---|
| Inductor L1 | 1 millihenry common mode choke type TLFI2VA102WR20, available from TAIYOYUDEN of Japan |
| Inductors, L2 through L6 | 390 Microhenries, Aircore |
| Integrated Circuit, U1 | 48 Volt D.C. to 15 Volt D.C. Converter Lambda Electronics, Inc. AS10-15-48 |
| Integrated Circuit, U2 | Three Terminal Adjustable Voltage Regulator Type LM317T |
| Integrated Circuit, U3 | 48 Volt D.C. to 15 Volt D.C. Converter Datel Inc. Part No. BWR-15/330 |
| Integrated Circuit, U4 | Opto-Isolator Hewlett-Packard Part No. HCPL-2731 |
| Integrated Circuit, U5 | 48 Volt D.C. to 300 Volt D.C. Converter Mil Electronics, Inc. Part No. Mil 300 VDC |
| Capacitors, C1, C1' and C2, C2' | 10 Microfarad, 20%, 100 Volt |
| Capacitors, C3, C3', C4, C4', C5, C5', C6, C6', C6", C7, C8, C8', C20 and C20' | 0.022 Microfarad |
| Capacitors, C9, C10, C11, C12, C13, C14 | 10 Microfarad, 10% |
| Capacitor, C15 | 0.1 Microfarad |
| Capacitor, C16 | 100 Microfarad |
| Capacitors, C17, C18 and C19 | 0.82 Microfarad 10% 400 Volt |
| Diode, D1 | Type 1N4003 |
| Resistor, R3 | 4.7 Kilohm, ¼ Watt, 5% |
| Resistor, R4 | 1 Kilohm, ¼ Watt, 5% |
| Ferrite Beads, L7, L8 and L9 | Steward Ferrite Material #28 |

In operation, switching power supply 20 may generate significant levels of undesired electrical switching energy. By floating the inputs to D.C. to D.C. converters U1, U3 and U5, the coupling of such noise to system loads 12, 14 and 16 is highly attenuated. However, doing so would ordinarily result in an undesired increase in radiated electromagnetic energy resulting from reflected current noise of D.C. to D.C. converters U1, U3 and U5. This radiated electromagnetic energy is suppressed in the preferred embodiment by the action of dual pi filter 63. Further attenuation of the radiated electromagnetic energy generated by power supply apparatus 10 is achieved by the action of low-pass filters 92, 94 and 96. In addition to floating the inputs of the D.C. to D.C. converters U1, U3 and U5, the electrical switching noise is further attenuated by the establishment of the A.C. impedance differential between earth ground 41 and system ground 40, as provided by inductors L7, L8 and L9. The bypass capacitors C3, C3', C5, C5', C8 and C8' located at the positive and negative inputs of the D.C. to D.C. converters U1, U3 and U5, effectively shunt a significant portion of the switching noise to earth ground 41. The residual noise that is not shunted to earth ground 41 by bypass capacitors C3, C3', C5, C5', C8 and C8', is either dissipated within the D.C. to D.C. converter themselves, or shunted to earth ground 41 by way of bypass capacitors C4, C4', C6, C6', C6", C20 or C20', located at the output terminals of D.C. to D.C. converters U1, U3, and U5. Once the electrical switching energy is shunted to earth ground 41, it is prevented from entering system ground 40 and interfering with the noise-sensitive loads 12, 14 and 16 by the inductive network connected between earth and system grounds. The inductive network is tuned so as to effectively dissipate the electrical switching energy, thereby ensuring that the system ground and the system loads are not contaminated with any undue noise or signal resulting from the operation of the switching power supply 20. Thus, apparatus 10 may include at least one switching power supply 20 without radiating excessive levels of EMI, or conducting undue levels of electrical noise to any of the loads 12, 14 and/or 16 connected to network 10.

In light of the present disclosure, those skilled in the art will recognize that various structural and/or operational changes can be made without departing from the scope of the invention as particularly pointed out and distinctly claimed in the appended claims including their legal equivalents.

What is claimed is:

1. In a D.C. power supply apparatus for supplying electrical energy to a system load connected to a system ground, said apparatus comprising a switching power supply disposed in a chassis connected to earth ground, and a D.C. to D.C. converter connected electrically between said switching power supply and the load, said switching power supply having an input coupleable to a source of alternating current electrical energy, and a pair of D.C. output terminals respectively coupled to a pair of input terminals of said D.C. to D.C. converter, said input terminals floating with respect to system ground, said D.C. to D.C. converter having a pair of output terminals connectable to the system load, the improvement comprising:

(a) capacitive means for shunting each of the respective input and output terminals of said D.C. to D.C. converter to earth ground: and (b) reactive circuit means for coupling said earth ground to said system ground so as to establish an A.C. impedance differential between said earth and system grounds, said reactive circuit means comprising an inductive network which is tuned to effectively isolate noise of predetermined frequency appearing on the earth ground from the system ground.

2. The apparatus of claim 1 further comprising a low-pass filter electrically connected between the switching power supply and the D.C. to D.C. converter.

3. The apparatus of claim 1 further comprising a low-pass filter electrically connected between the D.C. to D.C. converter and the system load.

4. A distributed power supply apparatus for supplying D.C. electrical energy to a plurality of system loads, each load being connected to a system ground, said apparatus comprising:

(a) at least one switching power supply disposed in a chassis connected to earth ground, said switching power supply having an input coupleable to a source of alternating current electrical energy, and a pair of D.C. output terminals;

(b) a plurality of D.C. to D.C. converters electrically connected in parallel between the switching power supply and each of the system loads, each of said D.C. to D.C. converters having (i) a pair of input terminals which float with respect to system ground, are shunted to earth ground by capacitive means and are coupled to the respective output terminals of the switching power supply, and (ii) a pair of D.C. output terminals connectable to a D.C. load, at least one of the output terminals of the D.C. to D.C. converter being connected to the earth ground by capacitive means;

(c) a low-pass filter electrically connected between the switching power supply and each of the said D.C. to D.C. converters;

(d) a low-pass filter electrically connected between each of said D.C. to D.C. converters and said system loads; and (e) reactive circuit means for coupling said earth ground to said system ground to establish an A.C. impedance differential between said earth and system grounds, said reactive circuit means comprising an inductive network which is tuned to effectively isolate noise of predetermined frequency appearing on the earth ground from appearing on the system ground.

* * * * *